(12) United States Patent
Lee

(10) Patent No.: US 9,381,814 B2
(45) Date of Patent: Jul. 5, 2016

(54) CHARGER BRACKET FOR REDUCING IMPACT LOAD

(71) Applicant: Hyundai Motor Company, Seoul (KR)

(72) Inventor: Seung-Geun Lee, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/461,832

(22) Filed: Aug. 18, 2014

(65) Prior Publication Data

US 2015/0165920 A1  Jun. 18, 2015

(30) Foreign Application Priority Data

Dec. 18, 2013 (KR) .................. 10-2013-0158339

(51) Int. Cl.
*F16M 13/00* (2006.01)
*B60L 3/00* (2006.01)
*B60L 11/18* (2006.01)

(52) U.S. Cl.
CPC ........... *B60L 3/0007* (2013.01); *B60L 11/1818* (2013.01); *Y02T 10/7005* (2013.01)

(58) Field of Classification Search
CPC .............. B60L 11/1879; B60L 3/0007; B60L 11/1818; Y02T 10/705; H01M 2220/30
USPC ............... 248/220.21, 221.11, 221.12, 224.8, 248/222.41, 223.21, 225.21, 900, 548; 320/113, 107, 109
See application file for complete search history.

(56) References Cited

U.S. PATENT DOCUMENTS

| | | | | |
|---|---|---|---|---|
| 1,248,320 | A * | 11/1917 | Hamilton | A47H 1/13 248/222.41 |
| 1,571,221 | A * | 2/1926 | Wilson | F21V 21/02 248/222.41 |
| 8,214,965 | B2 * | 7/2012 | Volz | B60S 1/0441 15/250.3 |
| 8,430,428 | B2 * | 4/2013 | Tinnin | B62D 1/195 188/371 |
| 9,132,732 | B2 * | 9/2015 | Yamashita | B60L 11/1818 |
| 2009/0315311 | A1 | 12/2009 | Tamakoshi | |
| 2012/0049799 | A1 * | 3/2012 | Terashima | B60K 1/04 320/109 |
| 2012/0208053 | A1 * | 8/2012 | Bender | B60L 11/1874 429/88 |
| 2015/0191093 | A1 * | 7/2015 | Yamamaru | B60L 11/14 320/109 |

FOREIGN PATENT DOCUMENTS

| | | | |
|---|---|---|---|
| JP | 4144350 | B2 | 9/2008 |
| JP | 2011-020601 | A | 2/2011 |
| JP | 2012-240478 | A | 12/2012 |
| KR | 1998-0035430 | U | 9/1998 |
| KR | 10-0357820 | B1 | 10/2002 |
| KR | 10-2005-0031617 | A | 4/2005 |
| KR | 20090062967 | A * | 6/2009 |

* cited by examiner

*Primary Examiner* — Kimberly Wood
(74) *Attorney, Agent, or Firm* — McDermott Will & Emery LLP

(57) ABSTRACT

A charger bracket for reducing an impact load may include a mounting portion to which a charger located at a front end module (FEM) of a vehicle is mounted to protrude. A plurality of mounting leg portions are provided at the mounting portion so as to be directed toward a body forming the FEM. A sliding slot is formed at each of the plural mounting leg portions and being detachably coupled to a fastening part formed in the body.

8 Claims, 4 Drawing Sheets

CHARGER BRACKET FOR REDUCING IMPACT LOAD

CROSS-REFERENCE(S) TO RELATED APPLICATIONS

This application claims the benefit of priority to Korean Patent Application No. 10-2013-0158339, filed on Dec. 18, 2013, which is incorporated herein by reference in its entirety.

TECHNICAL FIELD

The present disclosure relates to a charger bracket for reducing an impact load, and more particularly, to a charger bracket for reducing an impact load, which enables the bracket for fixing a charger to a front end module (FEM) of a hybrid or electric vehicle to decouple from the FEM in the event of a collision.

BACKGROUND

A hybrid vehicle or an electric vehicle is provided with a charger for charging a high capacity battery. The charger is often located at a front end module (FEM), namely in the vicinity of a hood fore-end and a grille of the vehicle.

The hood fore-end and the grille of the vehicle are collision parts in the pedestrian collision regulations and product test.

FIG. 4 is a view illustrating an installation state of a conventional FEM direct-coupled charger bracket. In FIG. 4, an end of the conventional charger bracket is bound to a body forming the FEM.

Since a charger C' and a conventional FEM direct-coupled charger bracket 10 located in the vicinity of a hood fore-end and a grille have a high strength and are not easily deformed, the charger C' and the conventional FEM direct-coupled charger bracket 10 transfer a high load to pedestrians in the event of a collision.

SUMMARY

An aspect of the present disclosure is directed to a charger bracket for reducing an impact load, which enables the bracket for fixing a charger to a FEM to decouple from the FEM in the event of a collision.

Other objects and advantages of the present disclosure can be understood by the following description, and become apparent with reference to embodiments of the present disclosure. It is obvious to those skilled in the art to which the present disclosure pertains that the objects and advantages of the present disclosure can be realized by the means as claimed and combinations thereof.

In accordance with an embodiment of the present disclosure, a charger bracket for reducing an impact load includes a mounting portion to which a charger located at a front end module (FEM) of a vehicle is mounted and being protrude. A plurality of mounting leg portions are provided at the mounting portion so as to be directed toward a body forming the FEM. A sliding slot is formed at one end of each of the plural mounting leg portions and being detachably coupled to a fastening part formed in the body.

The mounting portion may be a plate and has a hollow portion into which the charger may be inserted.

Each of the mounting leg portions may be a plate and protrude from a side of the mounting portion so as to be perpendicular to the fastening part.

The sliding slot may be formed at an end of the mounting leg portion.

The sliding slot may have a link portion linked to a fixing protrusion provided at the fastening part.

The link portion may be an inward cut portion of one side of the sliding slot in a width direction of the line portion. The link portion may be provided with a first inclined portion which guides a separation direction of the sliding slot and the fixing protrusion in the event of a collision.

The first inclined portion may have a shape to be cut by a set angle from one side of the sliding slot in the width direction thereof toward a center line of the sliding slot in a longitudinal direction thereof.

The first inclined portion may have, at an inside end thereof, a fixing groove into which the fixing protrusion is inserted.

A second inclined portion may be symmetrical with the first inclined portion on the basis of the fixing groove.

The fixing protrusion may have a head portion horizontal to the fastening part, and the link portion may be inserted between the head portion and the fastening part.

The fixing protrusion may be a screw fixed to the fastening part.

DESCRIPTION OF SPECIFIC EMBODIMENTS

Figure 1:
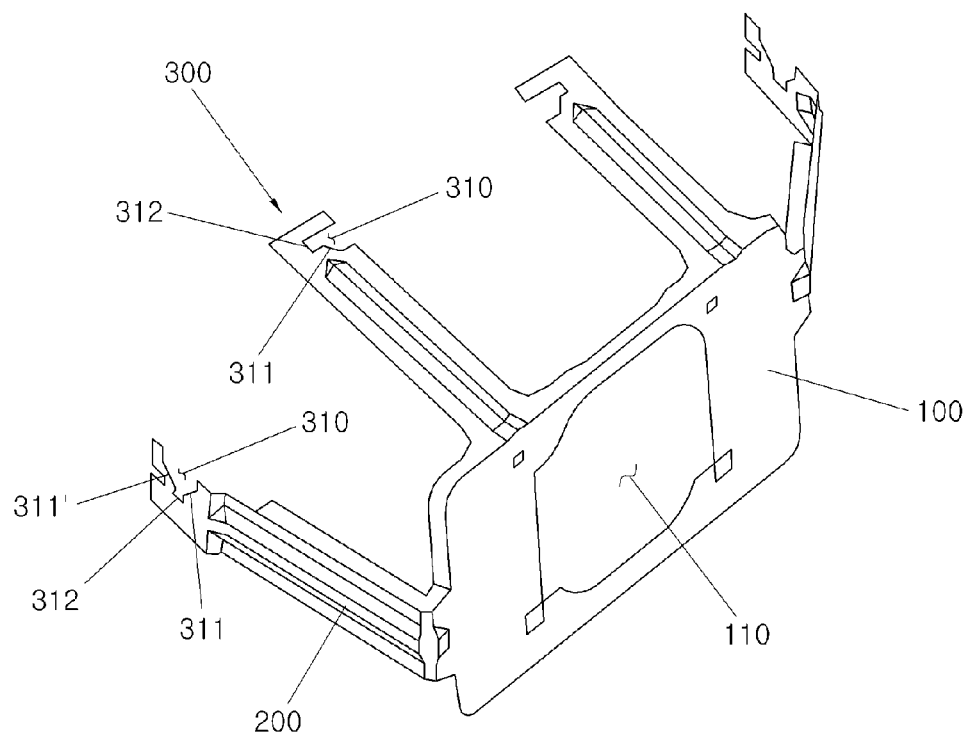
FIG. 1 is perspective view illustrating a charger bracket for reducing an impact load according to an embodiment of the present disclosure.

Exemplary embodiments of the present disclosure will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present disclosure.

Figure 2:
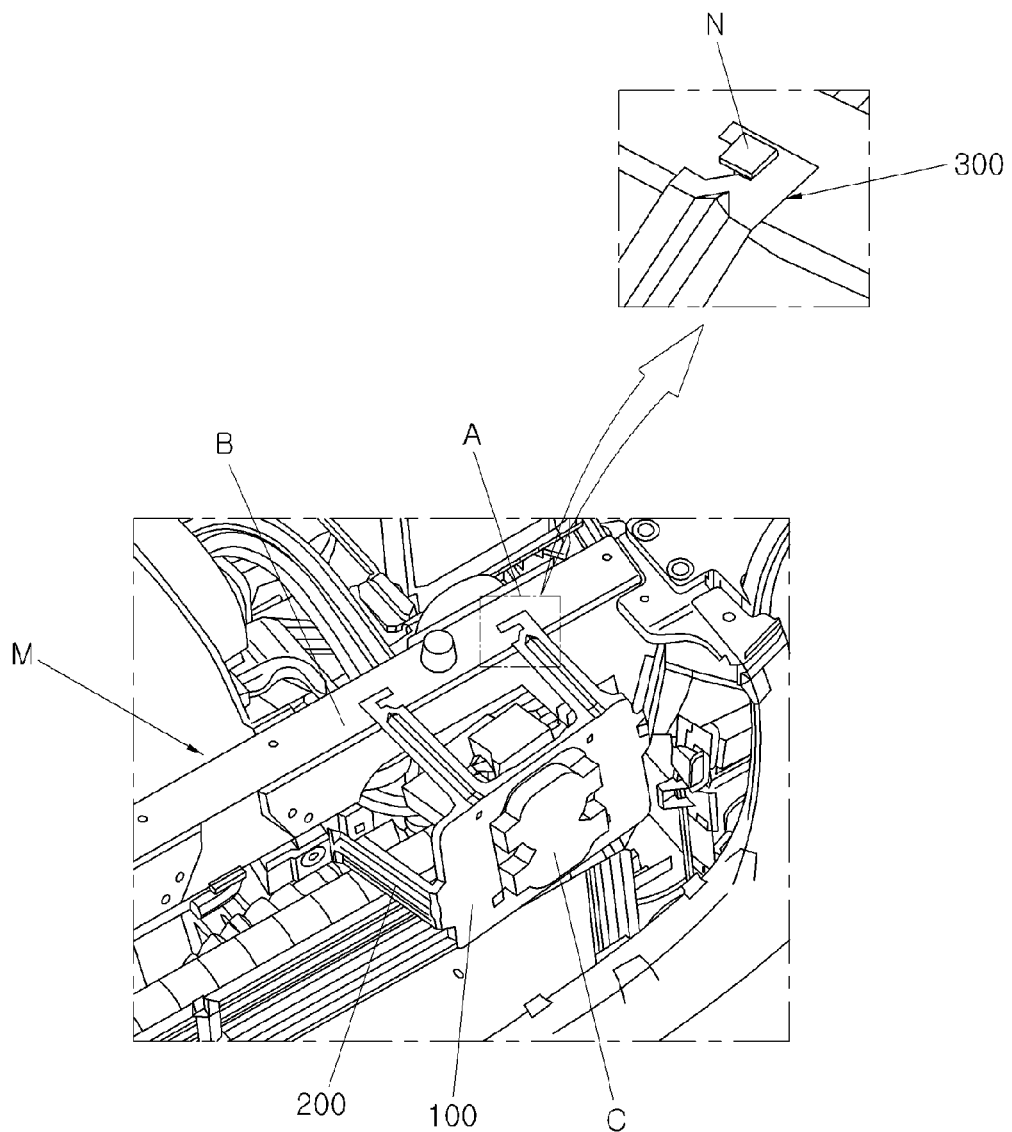
FIG. 2 is a view illustrating an installation state of the charger bracket for reducing an impact load in FIG. 1.
Figure 3:
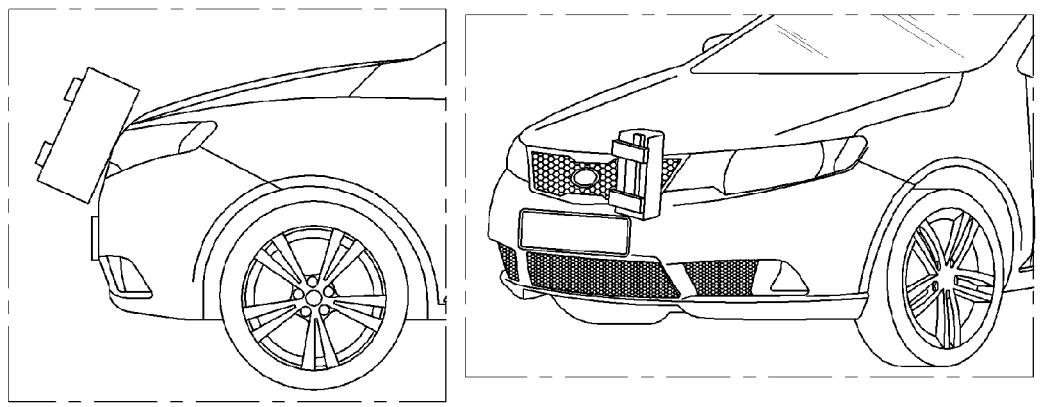
FIG. 3 is a view illustrating another installation state of the charger bracket for reducing an impact load in FIG. 1 and an example of a vehicle collision.
Figure 3:
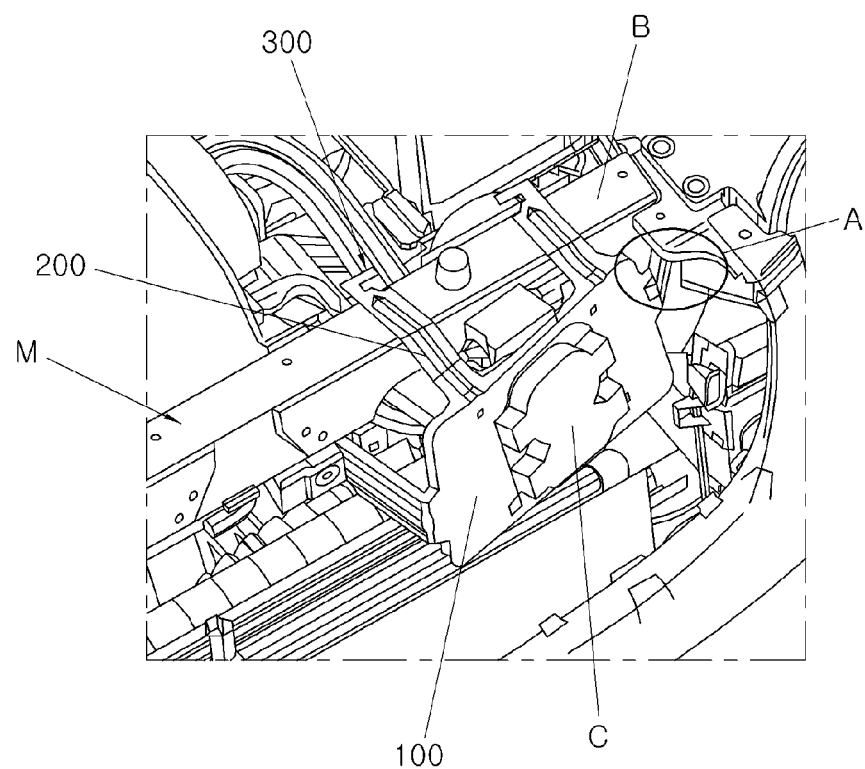
Figure 4:
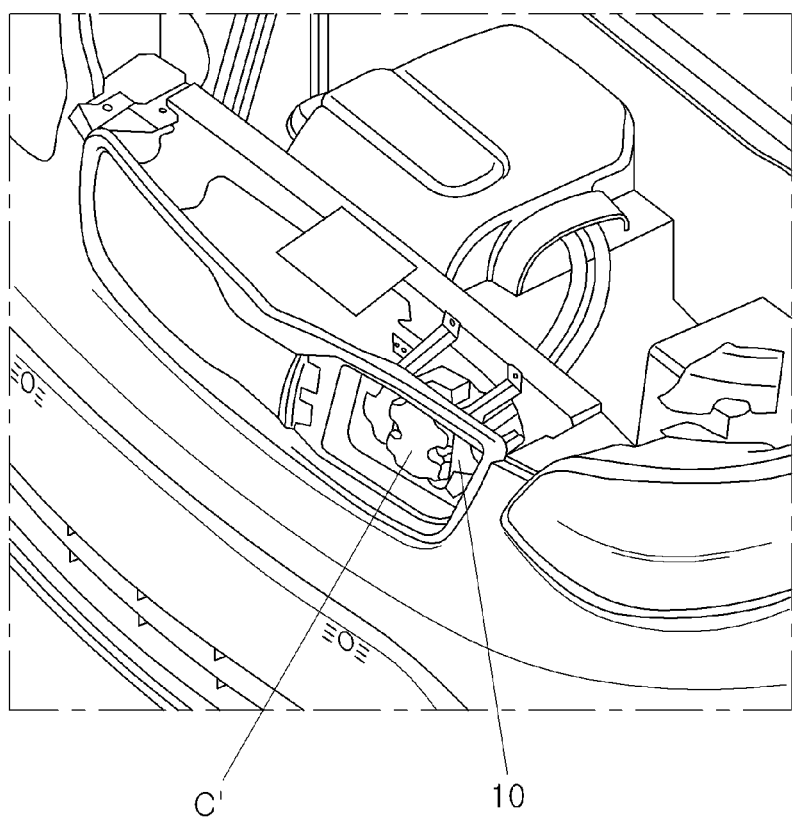
FIG. 4 is a view illustrating an installation state of a conventional FEM direct-coupled charger bracket.

FIG. 1 is perspective view illustrating a charger bracket for reducing an impact load according to an embodiment of the present disclosure. FIG. 2 is a view illustrating an installation state of the charger bracket for reducing an impact load in FIG. 1. FIG. 3 is a view illustrating another installation state of the charger bracket for reducing an impact load in FIG. 1 and an example of a vehicle collision.

As shown in FIGS. 1 to 3, the charger bracket for reducing an impact load according to the embodiment of the present disclosure includes a mounting portion 100 to which a charger C located at a front end module (FEM) M of a vehicle is mounted and protrudes. A plurality of mounting leg portions 200 are provided at the mounting portion 100 and directed toward a body B which forms the FEM M. A sliding slot 300 is formed at one end of each of the plural mounting leg portions 200 to detachably couple to a fastening part A formed in the body B.

In the embodiment of the present disclosure, the mounting portion 100 is a plate and includes a hollow portion 110 into which the charger C is inserted.

Each of the mounting leg portions 200 is a plate and protrudes from a side of the mounting portion 100 so as to be perpendicular to the fastening part A. The sliding slot 300 is formed at an end of the mounting leg portion 200.

The sliding slot 300 is formed with a link portion 310 linked to a fixing protrusion N provided at the fastening part A.

The fixing protrusion N located at an upper portion of the body B is formed with a head portion horizontal to the fastening part A, and the link portion 310 is inserted between the head portion and the fastening part A. In the embodiment of the present disclosure, the fixing protrusion N located at the upper portion of the body B is a screw fixed to the fastening part A.

The link portion 310 is formed by being cut inwardly from one side of the sliding slot 300 in a width direction thereof, and is provided with a first inclined portion 311 which guides a separation direction of the sliding slot 300 and the fixing protrusion N in the event of a collision.

In the embodiment of the present disclosure, the first inclined portion 311 formed in the link portion 310 inserted between the fastening part A located at the upper portion of the body B and the fixing protrusion N formed at the fastening part A is formed in such a way to be cut by a predetermined angle from one side of the sliding slot 300 in the width direction thereof toward a center line of the sliding slot 300 in a longitudinal direction thereof.

In this case, an inside end of the first inclined portion 311 is formed with a fixing groove 312 into which the fixing protrusion N is inserted, thereby allowing the sliding slot 300 to be not easily removed between the fastening part A and the fixing protrusion N.

In addition, in the embodiment of the present disclosure, there is provided a fastening part passing through a front side surface of the body B, and a bar as a fixing protrusion is provided inside the fastening part passing through the front side surface of the body B.

The link portion 310 of the sliding slot 300 inserted into the fastening part passing through the front side surface of the body B is formed with a second inclined portion 311' such that the second inclined portion 311' is symmetrical to the inclined portion 311 on the basis of the fixing groove 312.

In the charger bracket for reducing an impact load according to the embodiment of the present disclosure configured as described above, the sliding slot 300 slides on the fastening part A to be decoupled from the fixing protrusion N, thereby moving the bracket toward the body B.

In this case, a moving direction of the sliding slot 300 is guided along inclined directions of the inclined portions 311 and 311', and a moving direction of the charger mounted to the mounting portion 100 is ultimately guided.

Since the charger and the charger bracket having a high strength are moved toward the body B, it may be possible to reduce an impact load applied to a person or an object colliding with the vehicle.

In accordance with a charger bracket for reducing an impact load according to an exemplary embodiment of the present disclosure, unlike a conventional FEM direct-coupled charger bracket which causes transfer of a high load to an object or a person colliding with a vehicle by preventing from being deformed in the event of a collision, it may be possible to reduce an impact load transferred to the object or the person colliding with the vehicle since a sliding slot is decoupled from a FEM in the event of the collision so that a position of the bracket is moved.

In addition, since the bracket is installed to the conventional FEM without a great change, the bracket is easily applicable thereto.

While the present disclosure has been described with respect to the specific embodiments, it will be apparent to those skilled in the art that various changes and modifications may be made without departing from the spirit and scope of the invention as defined in the following claims.

What is claimed is:

1. A charger bracket for reducing an impact load, comprising:
   a mounting portion to which a charger located at a front end module (FEM) of a vehicle is mounted to protrude;
   a plurality of mounting leg portions provided at the mounting portion and being directed toward a body forming the FEM; and
   a sliding slot formed at each of the plurality of mounting leg portions and being detachably coupled to a fastening part formed in the body,
   wherein the sliding slot is formed at a side of each mounting leg portion and has a link portion linked to a fixing protrusion which is provided at the fastening part,
   wherein the link portion is an inward cut portion at one side of the sliding slot in a width direction of the sliding slot,
   wherein the link portion includes: a first inclined portion guiding movement of the sliding slot in an event of collision; a fixing groove formed at a most inward side of the link portion from which the link portion gradually increases along the first inclined portion; and a straight portion facing and being asymmetric to the first inclined portion, in which at least two link portions face each other, and
   wherein the sliding slot decouples from the fixing protrusion in the event of collision, in which the charger bracket moves toward the body to reduce the impact load applied to a person or an object colliding with the vehicle.

2. The charger bracket of claim 1, wherein:
   the mounting portion is a plate and has a hollow portion; and
   the charger is inserted into the hollow portion.

3. The charger bracket of claim 1, wherein each of the mounting leg portions is a plate and protrudes from a side of the mounting portion to be perpendicular to the fastening part.

4. The charger bracket of claim 3, wherein the sliding slot is formed at an end of each mounting leg portion.

5. The charger bracket of claim 1, wherein the first inclined portion has a shape to be cut by a set angle from one side of the sliding slot in the width direction thereof toward a center line of the sliding slot in a longitudinal direction thereof.

6. The charger bracket of claim 5, wherein the fixing protrusion is inserted into the fixing groove.

7. The charger bracket of claim 1, wherein the fixing protrusion has a head portion horizontal to the fastening part and the link portion is inserted between the head portion and the fastening part.

8. The charger bracket of claim 1, wherein the fixing protrusion is a screw fixed to the fastening part.

* * * * *